United States Patent
Johnson

(10) Patent No.: US 6,324,448 B1
(45) Date of Patent: Nov. 27, 2001

(54) METHODS, APPARATUS AND COMPUTER PROGRAM PRODUCTS FOR DETERMINING THE VERTICAL SPEED OF AN AIRCRAFT

(75) Inventor: Steven C. Johnson, Issaquah, WA (US)

(73) Assignee: Honeywell International, Inc, Morristown, NJ (US)

( * ) Notice: Subject to any disclaimer, the term of this patent is extended or adjusted under 35 U.S.C. 154(b) by 0 days.

(21) Appl. No.: 09/570,099

(22) Filed: May 12, 2000

Related U.S. Application Data

(60) Provisional application No. 60/134,089, filed on May 14, 1999.

(51) Int. Cl.[7] .............................. G05D 1/00; G05D 3/00; G05D 13/00; G06F 7/00; G06F 17/00; G06F 19/00

(52) U.S. Cl. .................... 701/7; 701/1; 701/3; 701/4; 701/5; 701/213-215; 701/220; 342/29; 342/30; 342/36; 342/46; 342/49; 342/32; 342/50; 342/57; 342/37; 342/352; 342/357.11; 340/970; 340/977; 340/945; 340/963; 340/980; 340/974; 340/988; 244/180; 244/181; 244/182; 244/188

(58) Field of Search .......................... 701/1, 3, 4, 5, 701/220, 213–215; 342/29, 30, 36, 46, 49, 32, 50, 57, 37, 352, 357.11; 340/970, 977, 945, 963, 980, 974, 988; 244/180, 181, 182, 188

(56) References Cited

U.S. PATENT DOCUMENTS

| | | | |
|---|---|---|---|
| 5,101,356 | * | 3/1992 | Timothy et al. ............... 701/213 |
| 5,119,101 | * | 6/1992 | Barnard ....................... 342/357 |
| 5,666,111 | * | 9/1997 | Servat et al. .................. 340/980 |
| 5,839,080 | * | 11/1998 | Muller et al. .................. 701/9 |
| 6,020,832 | * | 2/2000 | Jensen ........................ 340/970 |
| 6,088,653 | * | 7/2000 | Sheikh et al. ................. 701/214 |
| 6,205,376 | * | 3/2001 | Gordon ....................... 701/4 |
| 6,219,592 | * | 4/2001 | Muller et al. .................. 701/9 |
| 6,262,679 | * | 7/2001 | Tran .......................... 342/29 |

FOREIGN PATENT DOCUMENTS

WO 200070354 * 11/2000 (WO).

* cited by examiner

Primary Examiner—William A. Cuchlinski, Jr.
Assistant Examiner—Ronnie Mancho

(57) ABSTRACT

A method, an apparatus and a computer program product are provided for accurately determining the vertical speed of an aircraft in a manner independent of signals provided by an air data computer, an inertial reference system and an inertial navigation system. Initially, a first vertical velocity of the aircraft is determined based upon a pressure altitude value associated with the aircraft. A second vertical velocity of the aircraft is also obtained from a GPS receiver carried by the aircraft. The first and second vertical velocities are then combined to determine the vertical speed of the aircraft. In this regard, the first and second vertical velocities are combined by complimentarily filtering the first and second vertical velocities. More particularly, the first vertical velocity is typically low pass filtered to remove high frequency noise that is attributable to the relatively low resolution of the first vertical velocity value. Additionally, the second vertical velocity is typically high pass filtered to reduce errors due to long-term drift. Thus, the vertical speed of the aircraft is determined according to the present invention so as to have the best attributes of both the first and second vertical velocity values while eliminating the most common types of errors included within the first and second vertical velocity values.

27 Claims, 4 Drawing Sheets

METHODS, APPARATUS AND COMPUTER PROGRAM PRODUCTS FOR DETERMINING THE VERTICAL SPEED OF AN AIRCRAFT

CROSS-REFERENCE TO RELATED APPLICATIONS

The present application claims priority from U.S. Provisional Application Ser. No. 60/134,089 entitled Vertical Speed Generator filed May 14, 1999 and from U.S. patent application Ser. No. 09/534,222 entitled Ground Proximity Warning System and Method Having a Reduced Set of Input Parameters filed Mar. 24, 2000, the contents of both of which are incorporated herein by reference.

FIELD OF THE INVENTION

The present invention relates generally to methods, apparatus and computer program products for determining the vertical speed of an aircraft and, more particularly, to methods, apparatus and computer program products for determining the vertical speed of an aircraft for use in a ground proximity warning system.

BACKGROUND OF THE INVENTION

Within aviation, the vertical speed or vertical velocity of an aircraft is an important flight parameter and is utilized in a variety of different manners. For example, a traffic collision avoidance system (TCAS) utilizes the vertical speed of an aircraft in its determination of aircraft separation and the performance of other navigation maintenance management functions.

A measure of the vertical speed of an aircraft can be provided by one of several different types of avionics equipment conventionally carried by commercial aircraft. For example, an inertial navigation system (INS) or an initial reference system (IRS) can provide signals indicative of the vertical speed, as well as the acceleration, attitude, altitude, position, magnetic heading/track, true heading/track and ground speed of an aircraft. Alternatively, an air data computer (ADC) can provide signals indicative of vertical speed, as well as the altitude, the computed airspeed, the corrected altitude, the true airspeed and the static air temperature.

By way of example, one particularly significant avionics subsystem that utilizes the vertical speed of the aircraft, as well as a number of other flight parameters, is a ground proximity warning system. Ground proximity warning systems, also known as terrain awareness systems, analyze the flight parameters of the aircraft, including the vertical speed, and the terrain surrounding the aircraft. Based on this analysis, these warning systems provide alerts to the flight crew concerning possible inadvertent collisions of the aircraft with surrounding terrain or other obstacles, including instances in which the flight path of the aircraft would appear to bring the aircraft in short of the runway.

Ground proximity warning systems often have several modes in order to provide various types of alerts depending upon the flight conditions. For example, the enhanced ground proximity warning system provided by Honeywell, Inc. has six primary modes of operation, at least two of which are dependent upon the vertical speed of the aircraft. In this regard, Mode 1 is designed to provide alerts for an aircraft having an excessive descent rate, i.e., a negative vertical velocity with an excessively large magnitude, that is relatively close to the underlying terrain. Mode 2 provides an alert in instances in which an aircraft is closing with the terrain at an excessive rate, even in instances in which the aircraft is not descending. Mode 3 provides alerts in instances in which an aircraft loses significant altitude immediately after take off or during a missed approach. Mode 3 is activated and deactivated, however, based upon the vertical velocity of the aircraft. Mode 4 provides alerts for insufficient terrain clearance based upon the phase of flight and the speed of the aircraft. In this regard, Mode 4 provides alerts based upon different criteria depending upon whether the aircraft is in the take off phase of flight or in the cruise or approach phases of flight and further depending upon whether the gear is in a landing configuration. Mode 5 also provides two levels of alerts when the aircraft flight path descends below the glideslope beam on front course instrument landing system (ILS) approaches. Finally, Mode 6 provides alerts or call-outs for descent below predefined altitudes or the like during an approach, as well as alerts for excessive roll or bank angles.

In addition to the various modes of operation, the enhanced ground proximity warning system provided by Honeywell, Inc. defines an alert envelope and, more particularly, both a caution envelope and a warning envelope. The imaginary alert envelopes move with the aircraft and are constructed to extend forwardly of the aircraft and to define a region in which alerts will be generated if terrain or other obstacles enter by penetrating one of the alert envelopes. In this regard, U.S. Pat. No. 5,839,080 to Hans R. Muller et al. and assigned to AlliedSignal Inc. describes an advantageous ground proximity warning system that generates an alert envelope. The contents of U.S. Pat. No. 5,839,080 are hereby incorporated by reference in their entirety.

As described by U.S. Pat. No. 5,839,080, an alert envelope is defined by a number of parameters, including a look ahead distance (LAD), a base width (DOFF) and a terrain floor ($\Delta$H). In general terms, the look ahead distance defines the distance in advance to the aircraft that the alert envelope extends. Similarly, the base width is the lateral width of the alert envelope at a location proximate the aircraft. Further, the terrain floor typically defines a vertical distance below the aircraft that is utilized during the construction of the floor of the alert envelope. Oftentimes, the terrain floor slopes downwardly or upwardly depending upon the flight path angle of the aircraft which, in turn, is at least partially dependent upon the vertical speed of the aircraft. Accordingly, the construction of the alert envelope is partly dependent upon the vertical speed of the aircraft.

As described by U.S. Pat. No. 5,839,080, the ground proximity warning system can construct a pair of alert envelopes, namely, a caution envelope and a warning envelope, that are each partly dependent upon the vertical speed of the aircraft as described above. While each envelope has a similar shape as described above, the caution envelope typically extends further ahead of the aircraft than the warning envelope and is therefore generally larger than the warning envelope. Accordingly, the ground proximity warning system will generate cautionary alerts in instances in which the upcoming terrain or other obstacles penetrate the caution envelope, but not the warning envelope. Once the upcoming terrain or other obstacles penetrate the warning envelope, however, the ground proximity warning system will generate a more severe warning alert. As such, a pilot can discern the severity of the alert and the speed with which evasive maneuvers must be taken in order to avoid the upcoming terrain or other obstacles based upon the type of alert that is provided, i.e., a less severe cautionary alert or a more severe warning alert.

While ground proximity warning systems have substantially improved the situational awareness of flight crews of commercial aircraft by providing a variety of alerts of upcoming situations that merit the attention of the flight crews and by providing graphical displays of the upcoming terrain, obstacles and other notable features, ground proximity warning systems generally require a relatively robust set of input parameters, including the vertical speed of the aircraft as noted above. For example, conventional ground proximity warning systems require a signal indicative of the radio altitude from a radio altimeter, signals indicative of the altitude, the computed airspeed, the corrected altitude, the barometric altitude rate, i.e., the vertical speed, the true airspeed and the static air temperature from an Air Data Computer (ADC), signals indicative of the position, the magnetic track and the corrected altitude from a Flight Management System (FMS), signals indicative of the acceleration, attitude, altitude, vertical speed, position, magnetic heading/track, true heading/track and ground speed from an inertial reference system (IRS), an inertial navigation system (INS) and/or an attitude heading reference system (AHRS), signals indicative of the position, position quality, altitude, ground speed, ground track, date, time and status from a global navigation positioning system (GNPS) or a global positioning system (GPS) (hereinafter collectively referenced as a GPS), signals indicative of the glideslope deviation, a localizer deviation and the selected runway coordinates from an instrument landing system (ILS) and/or a microwave landing system (MLS) as well as other signals from other avionic subsystems. Therefore, for a conventional ground proximity warning system to be fully functional, the aircraft must not only carry the ground proximity warning system, but must also have a number of other subsystems, such as a radio altimeter, an ADC, an FMS, an IRS, an INS or an AHRS, a GPS and an ILS or a MLS. As will be apparent, each of these subsystems is quite expensive. However, most large commercial aircraft are mandated to have most, if not all, of these subsystems, such that the input parameters required by a conventional ground proximity warning system are readily available.

In contrast to commercial aircraft, general aviation aircraft, such as light turbine and piston aircraft, are not required to have many of the foregoing subsystems and, as a result, do not carry most of the foregoing subsystems since each subsystem is quite expensive. For example, most general aviation aircraft do not include a radio altimeter, an ADC, an INS or an IRS. Even though GPS is becoming increasingly more affordable and many general aviation aircraft therefore carry GPS equipment, conventional ground proximity warning systems cannot function properly based upon the parameters provided solely by the GPS without input from a variety of other subsystems that are not generally carried by general aviation aircraft. As such, a ground proximity warning system has been developed by Honeywell, Inc. that is specifically designed to operate based upon a reduced set of input parameters as described by U.S. patent application Ser. No. 09/534,222 entitled Ground Proximity Warning System and Method Having a Reduced Set of Input Parameters filed Mar. 24, 2000.

With respect to vertical speed, most general aviation aircraft do not carry the avionics subsystems that typically provide signals indicative of the vertical speed of the aircraft. In this regard, most general aviation aircraft do not carry an ADC, an INS or an IRS that typically provide signals indicative of the vertical speed for commercial aircraft. However, general aviation aircraft do have several options for obtaining a vertical speed value. For example, for general aviation aircraft that carry a GPS unit, the GPS unit may provide signals indicative of the vertical velocity of the aircraft. In addition, the GPS unit will provide signals indicative of the altitude of the aircraft from which the vertical speed of the aircraft can be determined by calculating the rate of change of the altitude of the aircraft. While the value of vertical velocity obtained from a GPS unit, either directly or by derivation from the altitude values, has relatively good resolution, such as 1 foot, the vertical velocity obtained from a GPS unit is subject to drift such that over the long term the vertical velocity obtained from a GPS unit is less reliable than generally desired.

General aviation aircraft also include means for determining the pressure altitude from which the vertical speed can be calculated based upon the rate of change of the pressure altitude. As described in U.S. patent application Ser. No. 09/255,670 entitled "Method and Apparatus for Determining Altitude" filed Feb. 23, 1999, however, pressure altitude is subject to some errors based upon the calculation of pressure altitude from the actual outside air pressure, i.e., a local pressure measurement, as well as assumed internationally agreed standard atmosphere (ISA) values for pressure at sea level, temperature at sea level and temperature lapse rate, i.e., the assumed variation of temperature as a function of altitude. See Introduction to Flight, $3^{rd}$ Edition (McGraw-Hill Series in Aeronautical and Aerospace Engineering), p. 79 (November 1988). For example, most general aviation aircraft include an altitude encoder for measuring the pressure altitude, albeit only to a resolution of 100 feet. While some blind encoders offer better resolution than altitude encoders, blind encoders are still limited to a resolution of about 10 feet. As such, while general aviation aircraft do include means for determining the pressure altitude from which the vertical speed can be calculated, the estimation of vertical speed derived from the rate of change of the pressure altitude will have an undesirably poor resolution.

General aviation aircraft typically fly at much lower altitudes and in much closer proximity to the underlying terrain and other obstacles than commercial aircraft and would therefore appear to have at least as great, if not greater, of a need for an accurate measure of the vertical speed of the aircraft for use in a ground proximity warning system and the like. However, general aviation aircraft cannot generally generate an accurate representation of the vertical speed of the aircraft since general aviation aircraft do not carry the other subsystems, such as an INS, an IRS and an ADC, that are utilized by commercial aircraft to measure vertical speed.

SUMMARY OF THE INVENTION

A method, an apparatus and a computer program product are provided according to the present invention for accurately determining the vertical speed of an aircraft in a manner independent of signals provided by an air data computer, an inertial reference system and an inertial navigation system. The method, apparatus and computer program product of the present invention are therefore particularly well suited for general aviation aircraft that do not include some of the more expensive avionics subsystems, but that require an accurate estimation of the vertical speed of the aircraft for use in a ground proximity warning system and the like.

According to the present invention, a first vertical velocity of the aircraft is determined based upon a pressure altitude value associated with the aircraft. Typically, the first vertical velocity of the aircraft is determined by the rate of change of a pressure altitude value over time. The pressure altitude can be measured by a variety of instruments, including an altitude encoder, a blind encoder and the like. According to the present invention, a second vertical velocity of the aircraft is also obtained from a GPS receiver carried by the aircraft. In one embodiment, the second vertical velocity of the aircraft is obtained by receiving a series of altitude values from the GPS receiver over time and then determining the rate of change of the altitude values provided by the GPS receiver. In order to further improve the accuracy of the second vertical velocity, the rate of change of the altitude values provided by the GPS receiver can also be low pass filtered. Alternatively, the second vertical velocity of the aircraft can be obtained directly from a GPS receiver that is designed to measure the vertical velocity of the aircraft.

According to the present invention, the first and second vertical velocities are combined to determine the vertical speed of the aircraft. In this regard, the first and second vertical velocities are combined in such a manner to compensate for potential errors in the first and second vertical velocities. As such, the resulting vertical speed of the aircraft is more accurate than either of the first and second vertical velocities taken individually. In this regard, the first and second vertical velocities are combined by complimentarily filtering the first and second vertical velocities. More particularly, the first vertical velocity is preferably low pass filtered to remove high frequency noise that is attributable to the relatively low resolution of the first vertical velocity value. Additionally, the second vertical velocity is preferably high pass filtered to reduce errors due to long-term drift. Thus, the vertical speed of the aircraft is determined according to the present invention so as to have the best attributes of both the first and second vertical velocity values while eliminating the most common types of errors included within the first and second vertical velocity values. Thus, the present invention should provide an accurate estimation of the vertical speed of the aircraft, even though the vertical speed is not measured by an ADC, an INS or an IRS.

In order to further improve the accuracy with which the vertical speed of the aircraft is determined, at least one of the first and second vertical velocities can be weighted based upon its respective resolution. For example, the first vertical velocity can be weighted based upon the resolution of the pressure altitude value from which the first vertical velocity is derived. Thus, a first vertical velocity derived from pressure altitude values provided by an altitude encoder can be discounted to a greater degree than a first vertical velocity that is based upon pressure altitude values measured by a blind encoder since the blind encoder has a greater resolution than an altitude encoder.

According to one embodiment, the validity of the signals provided by the GPS receiver, including the signals from which the second vertical velocity of the aircraft is obtained, is monitored to insure that the vertical speed of the aircraft is only based upon valid data. In this regard, it is determined if at least a predetermined number of satellites are in view of the GPS receiver. If less than the predetermined number of satellites are in view of the GPS receiver, the second vertical velocity is maintained equal to its prior value, such as the last value of the second vertical velocity that was obtained based upon at least the predetermined number of satellites being in view of the GPS receiver. If less than the predetermined number of satellites are in view of the GPS receiver for a continuous period that is at least as great as a predetermined time, a signal can be provided to indicate that the vertical speed is unreliable since the last valid value of the second vertical velocity may no longer be representative of the vertical speed of the aircraft.

According to one aspect of the present invention, the vertical speed of the aircraft is determined by an apparatus that includes a processor that determines the first vertical velocity of the aircraft based upon pressure altitude values, obtains a second vertical velocity from a GPS receiver and is adapted to combine the first and second vertical velocities to determine the vertical speed of the aircraft, such as by complimentarily filtering the first and second vertical velocities. According to another aspect of the present invention, the vertical speed of the aircraft is determined by a computer program product that includes a computer readable storage medium having computer readable program code means embodied therein. The computer readable program code means includes first computer instruction means for determining the first vertical velocity of the aircraft based upon pressure altitude values, second computer instruction means for obtaining a second vertical velocity of the aircraft from a GPS receiver and a third computer instruction means for combining the first and second vertical velocities to determine the vertical speed of the aircraft.

By combining the vertical velocity of the aircraft that is premised upon pressure altitude and obtaining the vertical velocity of the aircraft from the GPS receiver, an accurate estimation of the vertical speed of the aircraft can be obtained since the first and second vertical velocities are combined in such a manner that those errors inherent in the first and second vertical velocities are attenuated, thereby obtaining a measure of the vertical speed that is more accurate than either the first or second vertical velocity value is individually. By determining the vertical speed of the aircraft based upon pressure altitude signals and signals provided by a GPS receiver, however, the vertical speed of the aircraft can be determined in a manner independent of signals provided by a an ADC, an IRS or an INS. Thus, the method, apparatus and computer program product of the present invention are particularly well suited for general aviation aircraft that may include a GPS receiver, but that typically do not include more expensive subsystems, such an ADC, an IRS or an INS.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein, rather, these embodiments are provided so that this disclosure will be thorough and complete, and will fully convey the scope of the invention to those skilled in the art. Like numbers refer to like elements throughout.

Figure 1:
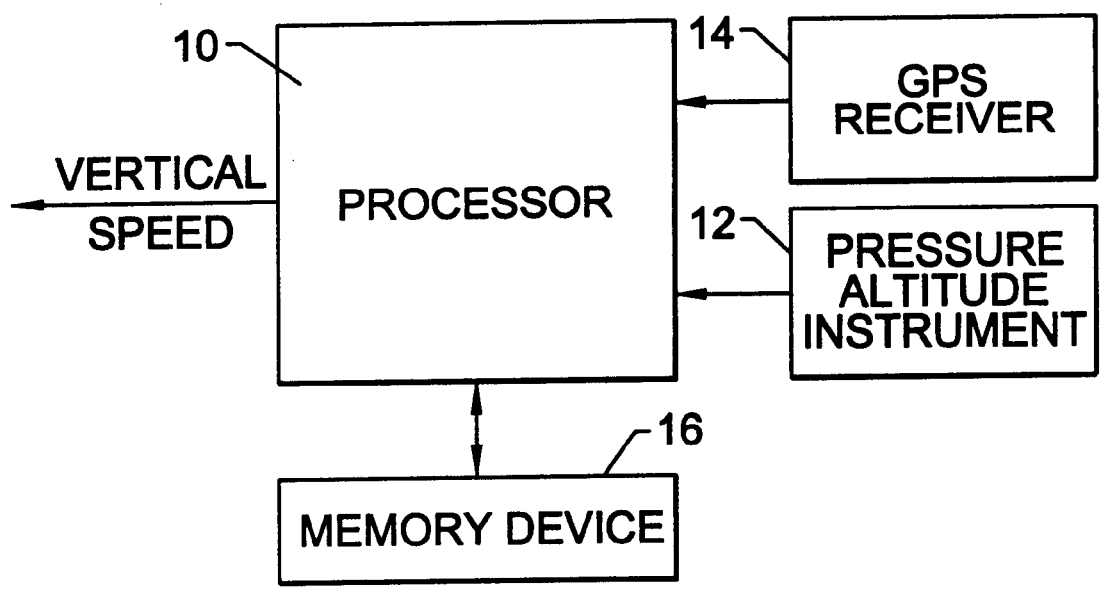
FIG. 1 is a block diagram of an apparatus for determining the vertical speed of an aircraft according to one embodiment of the present invention.

Referring now to FIG. 1, a block diagram depicting an apparatus for determining the vertical speed of an aircraft according to one embodiment of the present invention is depicted. As generally illustrated, the apparatus includes a processor 10 for communicating with an instrument 12 for measuring pressure altitude values and with a GPS receiver 14 and for determining the vertical speed of the aircraft. The processor can then provide the vertical speed of the aircraft to a ground proximity warning system or other avionics subsystems, such as TCAS, as desired. In this regard, the ground proximity warning system can utilize the vertical speed of the aircraft in the generation of Mode 1 alerts, i.e., those alerts triggered by an excessive descent rate near the terrain, and Mode 3 alerts that are frequently activated and deactivated based upon the vertical speed of the aircraft, i.e., Mode 3 alerts are only issued while the aircraft is descending. The ground proximity warning system can also utilize the vertical speed of the aircraft in the construction of the terrain caution and warning envelopes.

Typically, the processor 10 is a data processing device, such as a microprocessor, a microcontroller or other central processing unit. However, the processor can be embodied in another logic device such as a DMA (direct memory access) processor, an integrated communication processor device, a custom VLSI (very large scale integration) device, or an ASIC (application specific integrated circuit) device. Moreover, the processor can be any other type of analog or digital circuitry or any combination of hardware and software that is designed to perform the processing functions described hereinbelow.

The processor 10 can receive the pressure altitude from a number of instruments 12. For example, the processor can accept pressure altitude from an altitude encoder that provides Gillham/Gray coded altitude data or a blind encoder, either individually or in combination with an altitude serializer. Altitude encoders generally have the poorest resolution, typically on the order of 100 feet, but are the most widely available sources of pressure altitude readings. In contrast, blind encoders typically have better resolution, such as about 10 feet, but are not as commonly deployed. As will be discussed hereinafter, the resolution of each instrument can be taken into account by the processor in the determination of the vertical speed of the aircraft. As used herein, pressure altitude generally refers to an uncorrected pressure altitude. In instances in which the pressure altitude can be corrected, however, such as in instances in which the pilot can enter the local air pressure, pressure altitude refers to the corrected pressure altitude. Thus, pressure altitude will be used generically herein for both corrected and uncorrected pressure altitude.

The processor 10 can also interface with a variety of GPS receivers 14 including an AlliedSignal Global GNS-XLS/2100 receiver as well as Honeywell GPS receivers bearing Model Nos. HG2021 and HT9100, either directly or via a GPS Express circuit board. Regardless of the type, the GPS unit will typically provide signals indicative of the GPS altitude as well as signals indicative of the latitude and longitude of the aircraft, the ground speed of the aircraft, the ground track angle of the aircraft (also known as the true track angle of the aircraft) and an indication of the quality of the navigation solution provided by the GPS unit. In addition, at least some GPS units will provide signals indicative of the vertical velocity of the aircraft. While the measure of the vertical velocity provided by the GPS unit has relatively good resolution, such as to within 1 foot, the measure of the vertical velocity provided by the GPS unit has a slowly varying error due to selective availability (SA), which is the result of intentional dithering of the satellite clock. As such, the vertical velocity provided by the GPS unit can disadvantageously drift over time.

In addition to GPS altitude, latitude, longitude, ground speed, ground track angle, signal quality and, in at least some embodiments, vertical velocity, the processor 10 can also receive and process several additional GPS signals including signals indicative of the number of satellites being tracked, the results of Receiver Autonomous Integrity Monitoring (RAIM) and an altitude aiding flag. As known to those skilled in the art, the results of RAIM provide an indication as to whether respective satellites are providing inaccurate data, while the altitude aiding flag identifies instances in which the GPS receiver 14 is communicating with less than a predetermined number, such as four, satellites. As will be described below, the processor may discount the GPS altitude and/or the GPS vertical velocity in instances in which the GPS receiver is communicating with less than a predetermined number of satellites since the signals provided by the GPS receiver will be much less precise.

Figure 2:
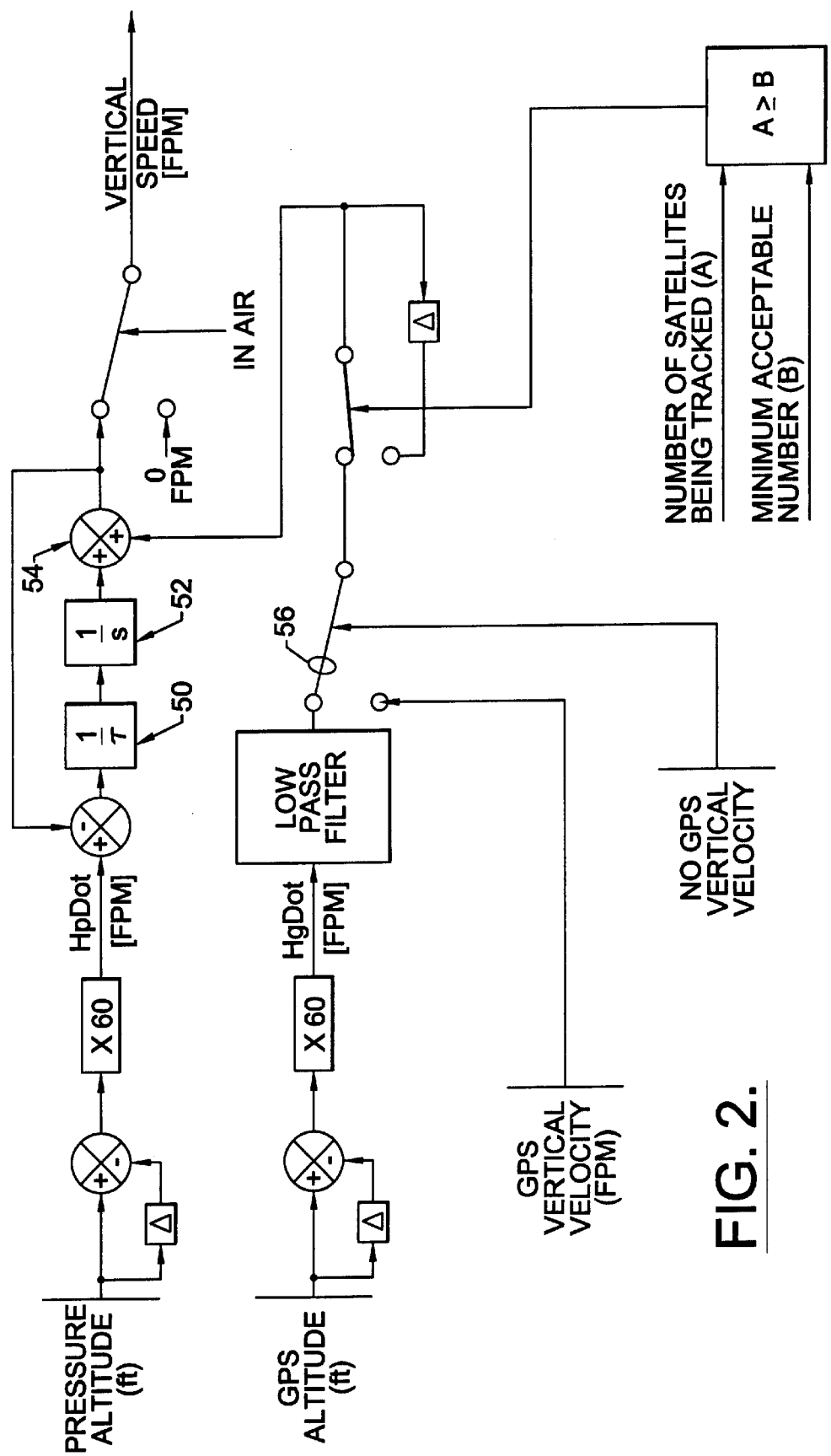
FIG. 2 illustrates the operations performed to determine the vertical speed of an aircraft according to one embodiment of the present invention.

According to the present invention, the processor 10 obtains first and second measures of the vertical velocity of the aircraft and thereafter combines the first and second measures of the vertical velocity to accurately determine the vertical speed of the aircraft. As described below, the processor derives the first vertical velocity from the pressure altitude and obtains the second vertical velocity from the GPS unit. With respect to the first vertical velocity and as depicted in FIG. 2 and blocks 20 and 22 of FIG. 4, the processor receives a series of pressure altitude values over time and determines the rate of the change of the pressure altitude values. The processor also generally multiplies the resulting rate of change by 60 to convert to feet per minute as opposed to feet per second in order to obtain the first vertical velocity, designated as HpDot in FIG. 2. See block 24.

With respect to the second vertical velocity, the processor 10 obtains the second vertical velocity differently depending upon whether the GPS receiver 14 provides a vertical velocity value or merely provides GPS altitude. If the GPS receiver provides signals indicative of the vertical velocity of the aircraft, the processor defines the second vertical velocity to be equal to the vertical velocity value provided by the GPS receiver. See blocks 26 and 28. If the GPS receiver does not provide vertical velocity, however, the processor receives a series of GPS altitude values over time and determines the rate of the change of the GPS altitude values. See blocks 30 and 32. The processor then multiplies the rate of change by 60 to convert to feet per minute as opposed to feet per second in order to obtain the second vertical velocity designated HgDot in FIG. 2. See block 34. As shown in FIG. 2 and in block 36 of FIG. 4, the processor can also low pass filter the second vertical velocity in order to remove high frequency noise and to smooth the resulting vertical velocity. While the low pass filter can be implemented in various fashions, the low pass filter of one embodiment is a three sample median filter.

The processor 10 then combines the first and second vertical velocities to determine the vertical speed of the aircraft. See block 38. In particular, the processor combines the first and second vertical velocities so as to include the best attributes of the first and second vertical velocities, while at least partially filtering or attenuating their less desirable attributes. For example, the processor preferably combines the first and second vertical velocities to determine the vertical speed of the aircraft in such a manner that the vertical speed has the resolution of the second vertical velocity, i.e., the vertical velocity obtained from the GPS receiver, and the long term stability of the first vertical velocity, i.e., the vertical velocity based upon pressure altitude. Moreover, the processor preferably combines the first and second vertical velocities in such a manner that the resulting vertical speed is not significantly adversely affected by either the drift of the second vertical velocity, i.e., the vertical velocity obtained from the GPS receiver, or the relatively poor resolution of the first vertical velocity, i.e., the vertical velocity based upon pressure altitude.

As such, the processor 10 preferably implements a complementary filter to combine the best attributes of the first and second vertical velocities. Although the complementary filter can be designed in a number of different manners, the complementary filter of the illustrated embodiment initially divides the difference between the first vertical velocity, i.e., the vertical velocity derived from pressure altitude, and the prior output of the complementary filter (as a result of the feedback described below) by a filter time constant, $\tau$, and then integrates the result. See blocks 50 and 52 of FIG. 2, respectively. By dividing by the filter time constant, the complementary filter can effectively weight the first vertical velocity. Preferably, the complementary filter weights the difference between the first vertical velocity and the prior filter output depending upon the resolution of the pressure altitude from which the first vertical velocity was derived, with greater time constants and, therefore, less weight being given to pressure altitude values having poorer resolution. In one embodiment, the processor selects the time constant $\tau$ as follows:

| Resolution of Pressure Altitude | $\tau$ |
|---|---|
| 100 feet | 60 |
| 10 feet | 30 |
| 1 foot | 10 |

However, the time constant $\tau$ need not be defined in terms of a few discrete values, but can be defined by a mathematical function that is typically at least partially dependent upon the resolution of the pressure altitude values.

So long as the aircraft is determined to be in the air, the processor 10 then sums the vertical velocity components obtained from the pressure altitude and the GPS receiver 14 to determine the vertical speed of the aircraft in feet per minute. See block 54 of FIG. 2. As shown, the processor can also negatively feed back the sum of the vertical velocity components such that the resulting vertical speed of the aircraft is actually defined as follows:

$$Vertical\ Speed = \frac{HgDot * \tau S}{\tau S - 1} + \frac{HpDot}{\tau S + 1}$$

As the above equation illustrates, the processor 10 therefore effectively low pass filters the first vertical velocity, i.e., the vertical velocity derived from pressure altitude, to reduce the high frequency noise. In contrast, the processor effectively high pass filters the second vertical velocity, i.e., the vertical velocity obtained from the GPS receiver 14, to reduce long term offset errors, i.e., drift.

Accordingly, the processor 10 of the embodiment depicted in FIG. 2 bases the determination of the vertical speed of the aircraft primarily upon the second vertical velocity obtained from the GPS receiver 14 due to its relatively good resolution with some corrections for drift or other trends away from the pressure altitude derived vertical velocity. Thus, the processor of the present invention effectively combines the best attributes of both the pressure altitude derived vertical velocity and the GPS derived vertical velocity to accurately determine the vertical speed of the aircraft.

Figure 3:
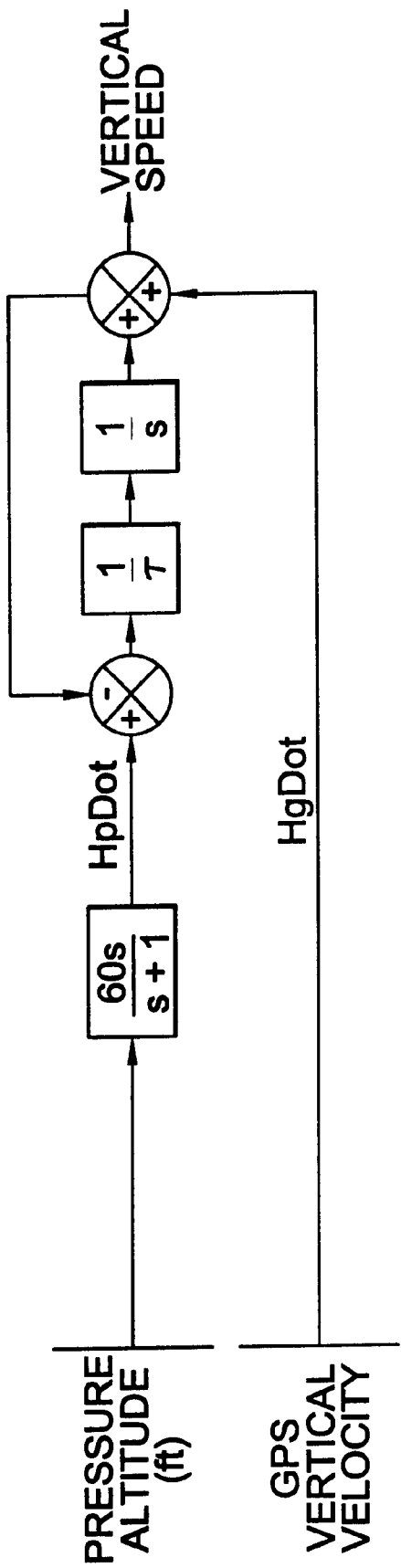
FIG. 3 illustrates the operations performed to determine the vertical speed of an aircraft according to another embodiment of the present invention.

As described above, the processor 10 can obtain the second vertical velocity either directly from a measure of the vertical velocity provided by the GPS receiver 14 or indirectly based upon the rate of change of the GPS altitude. Since vertical velocity based upon the rate of change of GPS altitude may tend to lag the somewhat, the processor is preferably designed to obtain the second vertical velocity directly from the GPS receiver, if the GPS receiver actually provides a measure of the vertical velocity. In this regard, FIG. 2 includes a switch 56 that selects the available GPS vertical velocity, not GPS altitude, as an input if the GPS vertical velocity is available and that selects GPS altitude as an input if the GPS vertical velocity is not available. The design of the processor can be simplified, however, if it is known in advance that the GPS receiver will provide a measure of vertical velocity. In this regard, FIG. 3 depicts the simplified operations performed by a processor that is designed to work with a GPS receiver that is known to provide a measure of vertical velocity.

Although not necessary for the present invention, the processor 10 can also monitor the number of satellites currently being tracked by the GPS receiver 14. In this regard, the processor can determine if the GPS receiver is currently tracking at least a predetermined minimum number of satellites, such as five in the illustrated embodiment. See block 40. If the GPS receiver is tracking at least the predetermined minimum number of satellites, the signals provided by the GPS receiver, including signals indicative of the GPS altitude and vertical velocity, if available, will be considered valid and subjected to further processing. If, however, the processor determines that the GPS receiver is currently tracking less than the predetermined minimum number of satellites, the processor of this advantageous embodiment will consider the signals that are currently being received from the GPS receiver to be invalid or otherwise unreliable. In this case, the processor maintains the second vertical velocity at a constant level, typically set equal to the immediately preceding value of the second vertical velocity, i.e., the last value for the second vertical velocity that is based on valid GPS signals. See block 42. The processor of this embodiment then continues to monitor the GPS receiver such that once the GPS receiver indicates that it is again tracking at least a predetermined minimum number of satellites, the processor will again deem the signals provided by the GPS receiver to be valid and will no longer hold the second vertical velocity to a constant value, but will resume updating of the second vertical velocity based upon the current signals provided by the GPS receiver.

If the GPS receiver 14 tracks less than the predetermined minimum number of satellites for an extended period of time, such as 30 or 60 seconds, the immediately preceding value of the second vertical velocity may no longer be representative of current vertical velocity of the aircraft. See block 44. As such, the processor 10 of this embodiment can provide a signal indicating that the resulting value of the vertical speed is invalid and otherwise untrustworthy until the GPS receiver resumes tracking at least the predetermined minimum number of satellites. See block 46. Alternatively, the processor can base the vertical speed of the aircraft entirely upon the first vertical velocity that is derived from the pressure altitude until the GPS receiver resumes tracking at least the predetermined minimum number of satellites. As such, the processor of this embodiment ensures that the value of the vertical speed of the aircraft is a true measure of the current vertical speed of the aircraft.

As described above, the method and apparatus of the present invention can accurately determine the vertical speed of an aircraft without reliance upon the relatively expensive subsystems, such as an ADC, an IRS and an INS, that typically provide measures of the vertical speed of commercial aircraft. Instead, the method and apparatus of the present invention accurately determine the vertical speed of the aircraft based only upon pressure altitude readings and signals provided by a GPS receiver 14, such as GPS altitude or GPS vertical velocity. Thus, the method and apparatus of the present invention is particularly significant for general aviation aircraft that do not commonly include the expensive subsystems carried by commercial aircraft, such as an ADC, an IRS and an INS.

As described above, the vertical speed of the aircraft determined by the method and apparatus of the present invention can be utilized in a number of manners by the aircraft and, particularly, other avionic subsystems carried by the aircraft. For aircraft that include a ground proximity warning system, for example, the vertical speed can be utilized in the construction of the caution and warning envelopes. More particularly, the flight path angle, which is dependent upon the vertical speed of the aircraft, is utilized to construct the floors of both the caution and warning envelopes. In addition, ground proximity warning systems rely upon the vertical speed of the aircraft to determine if the aircraft is descending at an excessive rate while flying at a relatively low altitude above ground and will issue a Mode 1 warning if this situation is detected. Furthermore, ground proximity warning systems typically rely upon the vertical speed to actuate and deactuate the Mode 3 warnings as the aircraft descends and ascends, respectively.

In addition to providing methods and apparatus for determining the vertical speed of an aircraft, the present invention also provides computer program products for determining the vertical speed of an aircraft. The computer program products have a computer readable storage medium having computer readable program code means embodied therein. In one embodiment, the apparatus of FIG. 1 can also include a memory device 16 that serves as the computer readable storage medium such that the processor can access the computer readable program code means embodied in the computer readable storage medium to determine the first vertical velocity of the aircraft, obtain the second vertical velocity of the aircraft and thereafter combine the first and second vertical velocities to determine the vertical speed of the aircraft.

In this regard, the computer readable program code means includes first computer instruction means for determining the first vertical velocity of the aircraft based upon pressure altitude values associated with the aircraft. The computer readable program code means also includes second computer instruction means for obtaining the second vertical velocity of the aircraft from the GPS receiver 14 carried by the aircraft. Further, the computer readable program code means includes third computer instruction means for combining the first and second vertical velocities to determine the vertical speed of the aircraft. As described above, the third computer instruction means combines the first and second vertical velocities by complimentarily filtering the first and second vertical velocities, typically by low pass filtering the first vertical velocity and high pass filtering the second vertical velocity, in order to determine the vertical speed of the aircraft. Thus, the third computer instruction means combines the first and second vertical velocities so as to determine the vertical speed of the aircraft in a manner independent of signals provided by a radio altimeter, an ADC or an INS.

According to one embodiment, the computer readable program code means also includes fourth computer instruction means for determining if at least a predetermined number of satellites are in view of the GPS receiver 14 and fifth computer instruction means for maintaining the second vertical velocity equal to a prior value if less than the predetermined number of satellites are in view of the GPS receiver. Additionally, the computer readable program code means can include sixth computer instruction means for providing a signal to indicate that the vertical speed is unreliable if less than the predetermined number of satellites are in view of the GPS receiver for a continuous period at least as great as a predetermined time.

Figure 4:
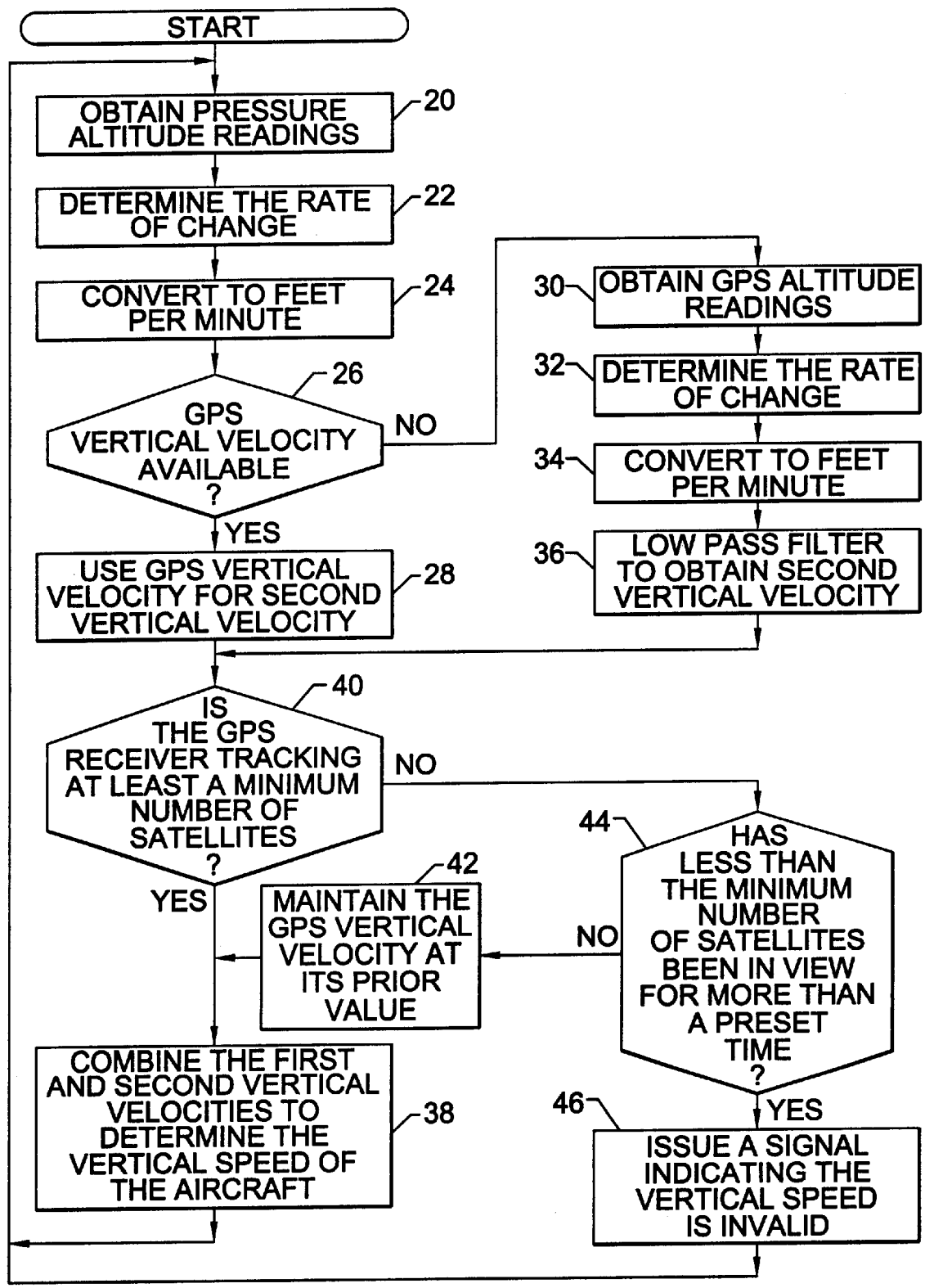
FIG. 4 illustrates the operations performed by the method, apparatus and computer program product to determine the vertical speed of an aircraft according to one embodiment of the present invention.

In this regard, FIGS. 2–4 are block diagram, flowchart and control flow illustrations of methods, systems and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

By combining the vertical velocity of the aircraft that is premised upon pressure altitude and obtaining the vertical velocity of the aircraft from the GPS receiver 14, the methods, apparatus and computer program products of the present invention provide an accurate estimation of the vertical speed of the aircraft by combining the first and second vertical velocities such that the sources of error inherent in the first and second vertical velocities are attenuated, and the resulting measure of the vertical speed is more accurate than either the first or second vertical velocity values are individually. By determining the vertical speed of the aircraft based upon pressure altitude signals and signals provided by a GPS receiver, the methods, apparatus and computer program products of the present invention also determine the vertical speed of the aircraft in a manner independent of signals provided by an ADC, an IRS or an INS. Thus, the methods, apparatus and computer program products of the present invention are particularly well suited for general aviation aircraft that could utilize information relating to vertical velocity and that may include a GPS receiver, but that typically do not include more expensive subsystems, such as an ADC, an IRS or an INS that measure the vertical velocity of commercial aircraft Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for determining vertical speed of an aircraft comprising:
    determining a first vertical velocity of the aircraft based upon a pressure altitude value associated with the aircraft;
    obtaining a second vertical velocity of the aircraft from a global positioning system (GPS) receiver carried by the aircraft; and
    combining the first and second vertical velocities to determine the vertical speed of the aircraft, wherein combining the first and second vertical velocities comprises complementarily filtering the first and second vertical velocities by low pass filtering the first vertical velocity and high pass filtering the second vertical velocity.

2. A method according to claim 1 wherein combining the first and second vertical velocities further comprises weighting at least one of the first and second vertical velocities based upon its respective resolution.

3. A method according to claim 2 wherein weighting at least one of the first and second vertical velocities comprises weighting the first vertical velocity based upon the resolution of the pressure altitude value.

4. A method according to claim 1 wherein determining the first vertical velocity of the aircraft comprises determining a rate of change of the pressure altitude value over time.

5. A method according to claim 1 wherein obtaining the second vertical velocity of the aircraft comprises:
    receiving a series of altitude values from the GPS receiver over time; and
    determining a rate of change of the altitude values provided by the GPS receiver.

6. A method according to claim 5 wherein obtaining the second vertical velocity of the aircraft further comprises low pass filtering the rate of change of the altitude values provided by the GPS receiver.

7. A method according to claim 1 wherein obtaining the second vertical velocity of the aircraft comprises receiving the second vertical velocity of the aircraft from the GPS receiver.

8. A method according to claim 1 wherein obtaining the second vertical velocity of the aircraft comprises repeatedly obtaining values for the second vertical velocity of the aircraft over time, and wherein the method further comprises:
    determining if at least a predetermined number of satellites are in view of the GPS receiver; and
    maintaining the second vertical velocity equal to a prior value of the second vertical velocity if less than the predetermined number of satellites are in view of the GPS receiver.

9. A method according to claim 8 further comprising providing a signal to indicate that the vertical speed is unreliable if less than the predetermined number of satellites are in view of the GPS receiver for a continuous period that is at least as great as a predetermined time.

10. An apparatus for determining vertical speed of an aircraft comprising:
    a processor for determining a first vertical velocity of the aircraft based upon a pressure altitude value associated with the aircraft, and for obtaining a second vertical velocity of the aircraft from a global positioning system (GPS) receiver carried by the aircraft,
        wherein said processor is adapted to combine the first and second vertical velocities to determine the vertical speed of the aircraft by complementarily filtering the first and second vertical velocities, and wherein said processor is adapted to complementarily filter the first and second vertical velocities by low pass filtering the first vertical velocity and high pass filtering the second vertical velocity.

11. An apparatus according to claim 10 wherein said processor is adapted to combine the first and second vertical velocities by also weighting at least one of the first and second vertical velocities based upon its respective resolution.

12. An apparatus according to claim 11 wherein said processor weights at least one of the first and second vertical velocities by weighting the first vertical velocity based upon the resolution of the pressure altitude value.

13. An apparatus according to claim 10 wherein said processor determines the first vertical velocity of the aircraft by determining a rate of change of the pressure altitude value over time.

14. An apparatus according to claim 10 wherein said processor obtains the second vertical velocity of the aircraft by receiving a series of altitude values from the GPS receiver over time, and determining a rate of change of the altitude values provided by the GPS receiver.

15. An apparatus according to claim 14 wherein said processor obtains the second vertical velocity of the aircraft by also low pass filtering the rate of change of the altitude values provided by the GPS receiver.

16. An apparatus according to claim 10 wherein said processor obtains the second vertical velocity of the aircraft by receiving the second vertical velocity of the aircraft from the GPS receiver.

17. An apparatus according to claim 10 wherein said processor obtains the second vertical velocity of the aircraft by repeatedly obtaining values for the second vertical velocity of the aircraft over time, and wherein said processor is further adapted to determine if at least a predetermined number of satellites are in view of the GPS receiver, and to maintain the second vertical velocity equal to a prior value of the second vertical velocity if less than the predetermined number of satellites are in view of the GPS receiver.

18. An apparatus according to claim 17 wherein said processor is further adapted to provide a signal to indicate that the vertical speed is unreliable if less than the predetermined number of satellites are in view of the GPS receiver for a continuous period that is at least as great as a predetermined time.

19. A computer program product for determining vertical speed of an aircraft, wherein the computer program product comprises a computer readable storage medium having computer readable program code means embodied therein, said computer readable program code means comprising:

first computer instruction means for determining a first vertical velocity of the aircraft based upon a pressure altitude value associated with the aircraft;

second computer instruction means for obtaining a second vertical velocity of the aircraft from a global positioning system (GPS) receiver carried by the aircraft; and third computer instruction means for combining the first and second vertical velocities to determine the vertical speed of the aircraft, wherein said third computer instruction means combines the first and second vertical velocities by complementarily filtering the first and second vertical velocities, and wherein said third computer instruction means complementarily filters the first and second vertical velocities by low pass filtering the first vertical velocity and high pass filtering the second vertical velocity.

20. A computer program product according to claim 19 wherein said third computer instruction means combines the first and second vertical velocities by weighting at least one of the first and second vertical velocities based upon its respective resolution.

21. A computer program product according to claim 20 wherein said third computer instruction means weights at least one of the first and second vertical velocities by weighting the first vertical velocity based upon the resolution of the pressure altitude value.

22. A computer program product according to claim 19 wherein said first computer instruction means determines the first vertical velocity of the aircraft by determining a rate of change of the pressure altitude value over time.

23. A computer program product according to claim 19 wherein said second computer instruction means obtains the second vertical velocity of the aircraft by receiving a series of altitude values from the GPS receiver over time, and by determining a rate of change of the altitude values provided by the GPS receiver.

24. A computer program product according to claim 23 wherein said second computer instruction means obtains the second vertical velocity of the aircraft by also low pass filtering the rate of change of the altitude values provided by the GPS receiver.

25. A computer program product according to claim 19 wherein said second computer instruction means obtains the second vertical velocity of the aircraft by receiving the second vertical velocity of the aircraft from the GPS receiver.

26. A computer program product according to claim 19 wherein said second computer instruction means obtains the second vertical velocity of the aircraft by repeatedly obtaining values for the second vertical velocity of the aircraft over time, and wherein the computer program product further comprises:

fourth computer instruction means for determining if at least a predetermined number of satellites are in view of the GPS receiver; and fifth computer instruction means for maintaining the second vertical velocity equal to a prior value of the second vertical velocity if less than the predetermined number of satellites are in view of the GPS receiver.

27. A computer program product according to claim 26 further comprising sixth computer instruction means for providing a signal to indicate that the vertical speed is unreliable if less than the predetermined number of satellites are in view of the GPS receiver for a continuous period that is at least as great as a predetermined time.

\* \* \* \* \*